C. WIEBKE.
BRANCHING MACHINE.
APPLICATION FILED MAY 23, 1914.
1,150,984.
Patented Aug. 24, 1915.
6 SHEETS—SHEET 3.
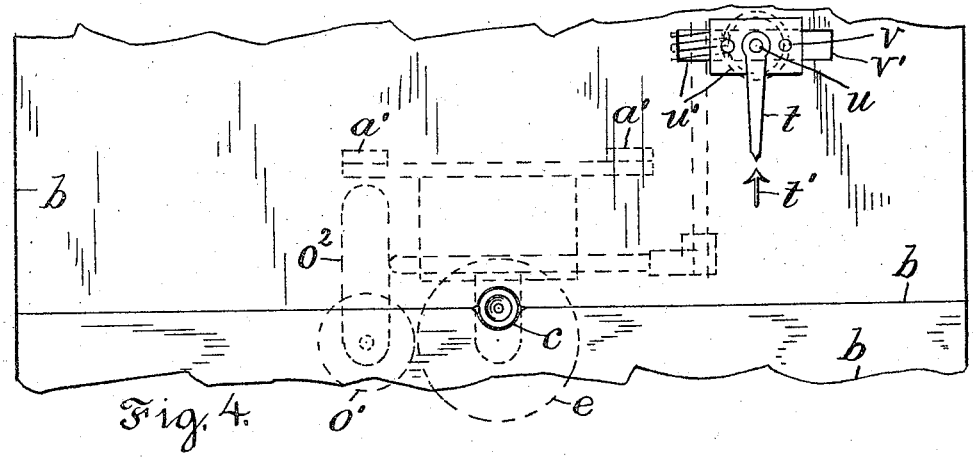
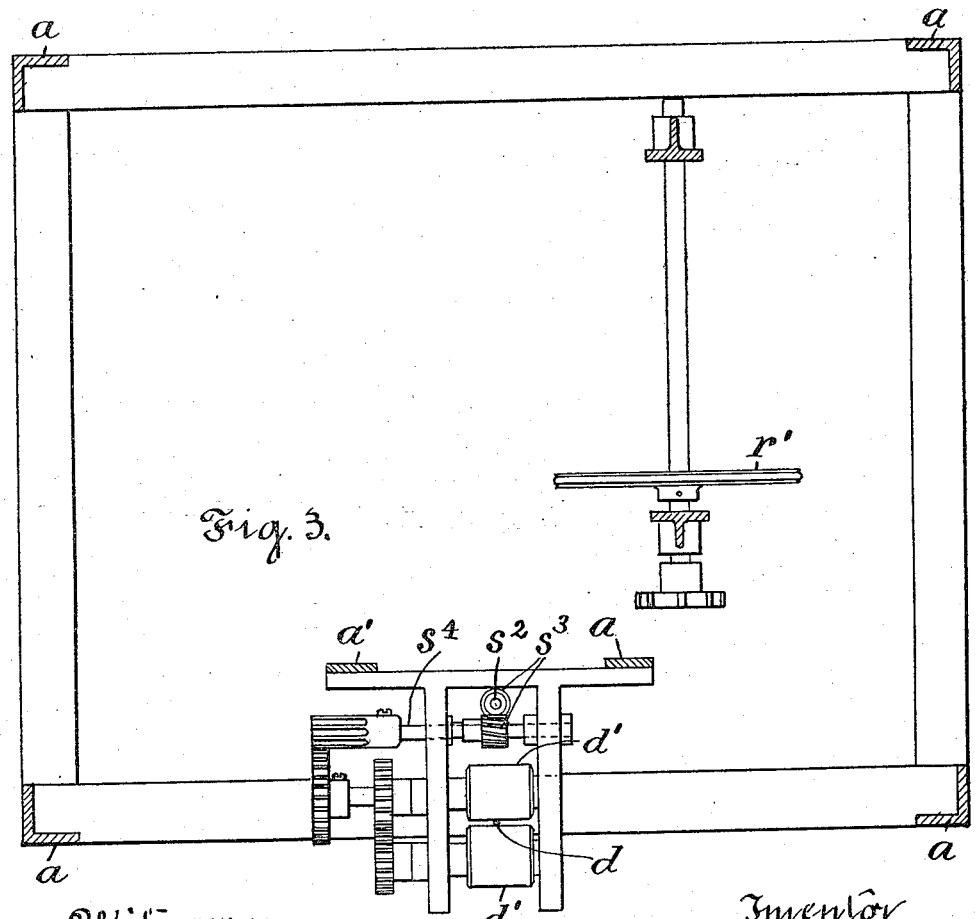

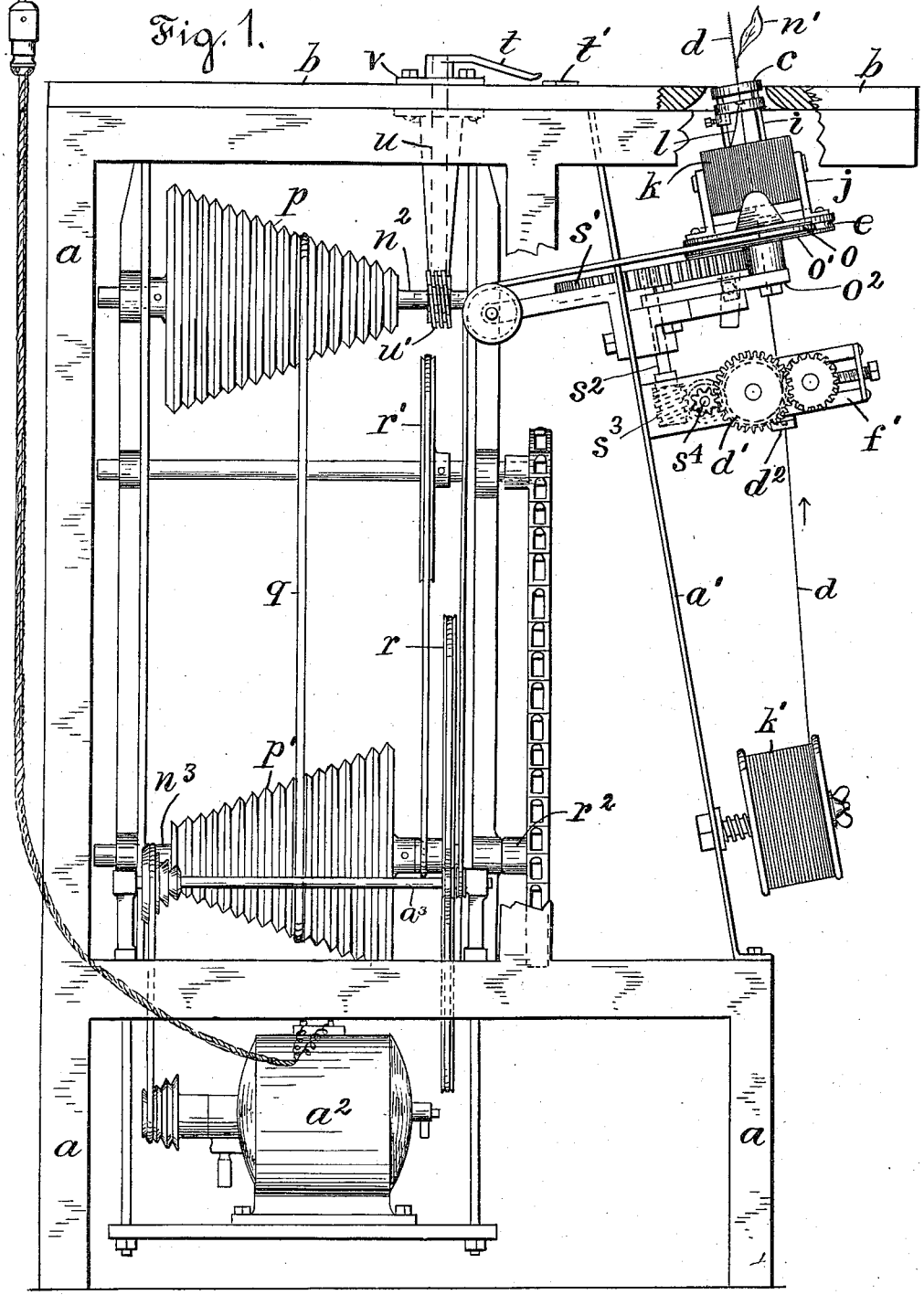

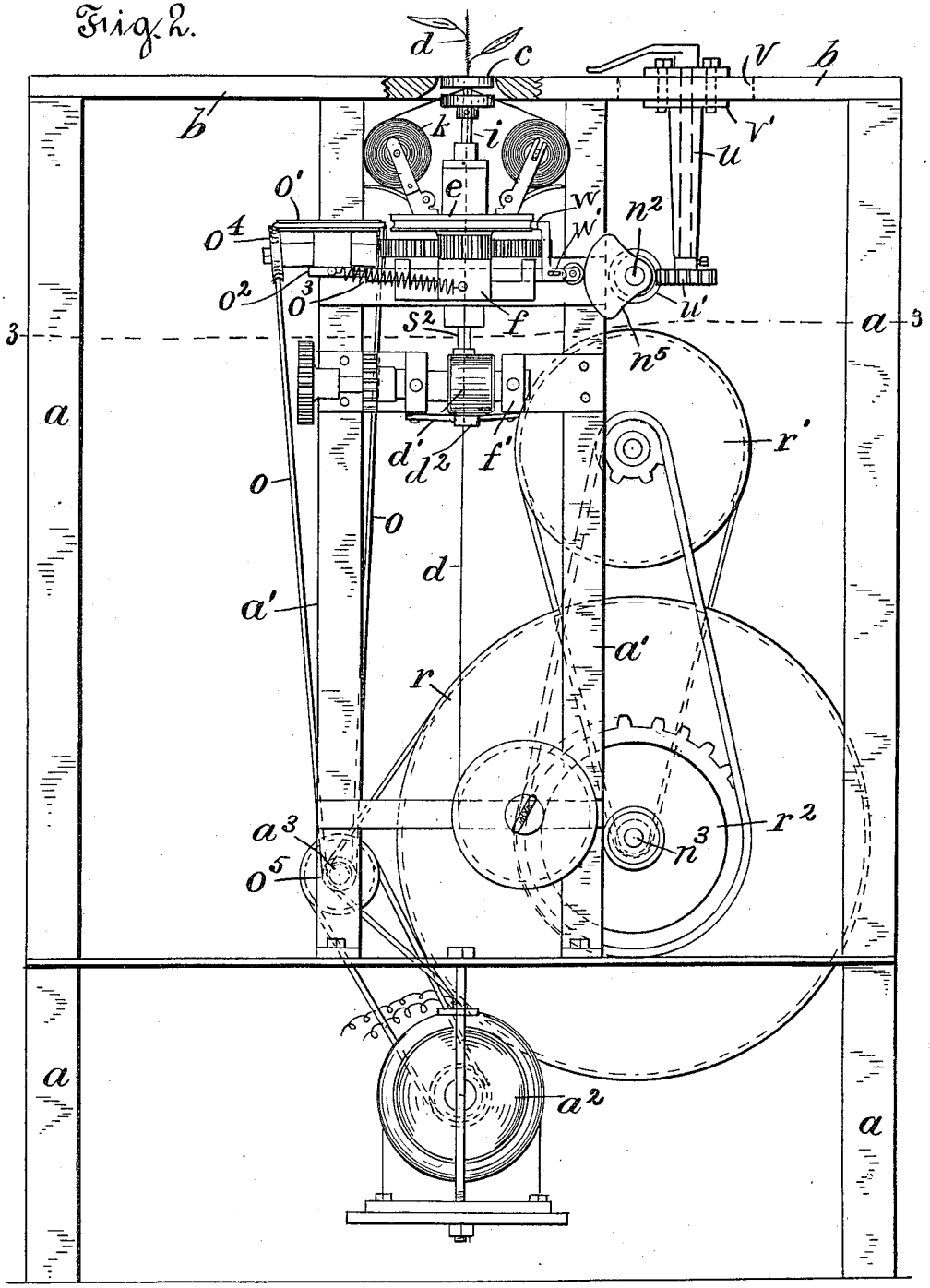

C. WIEBKE.
BRANCHING MACHINE.
APPLICATION FILED MAY 23, 1914.

1,150,984.

Patented Aug. 24, 1915.
6 SHEETS—SHEET 4.

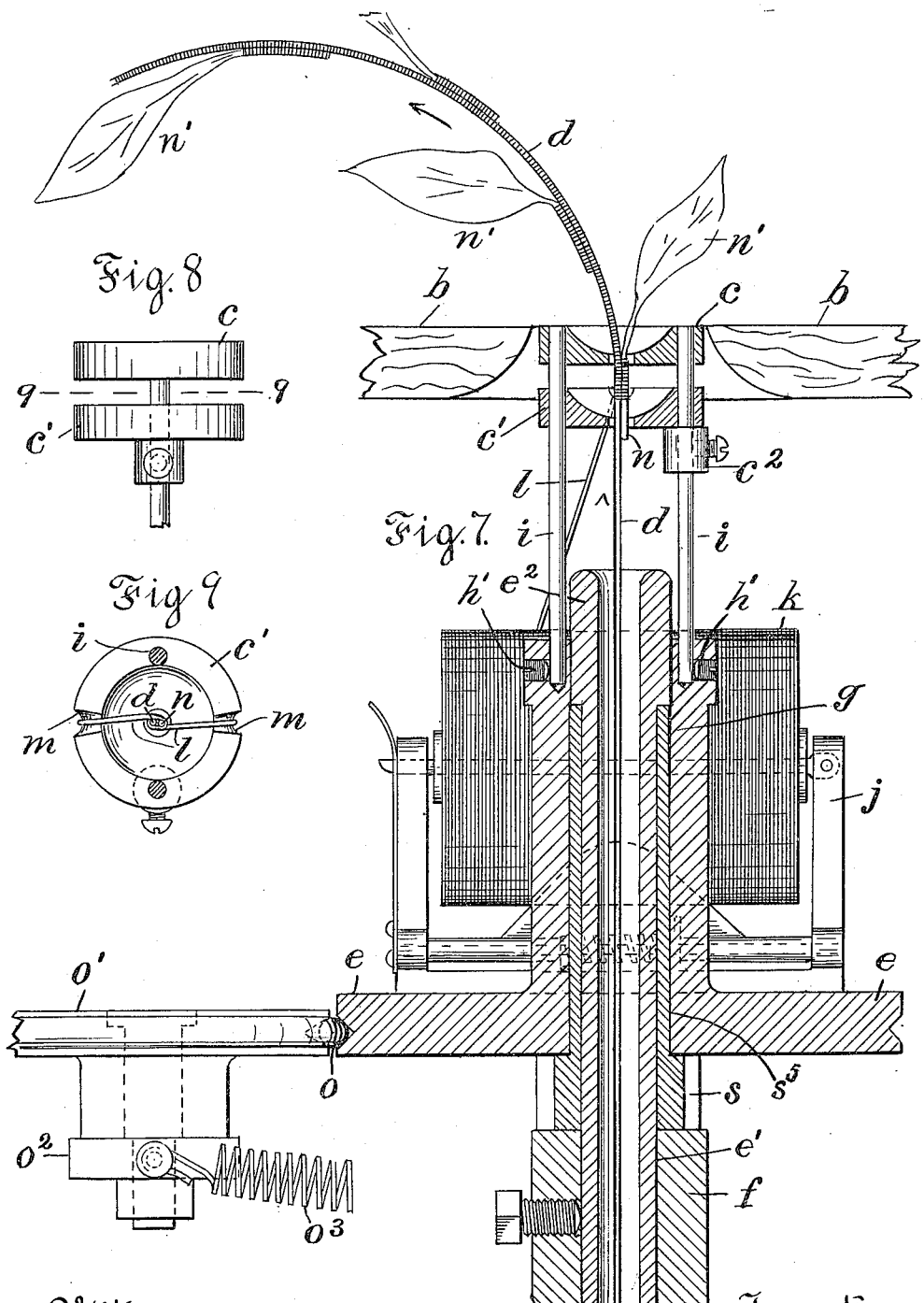

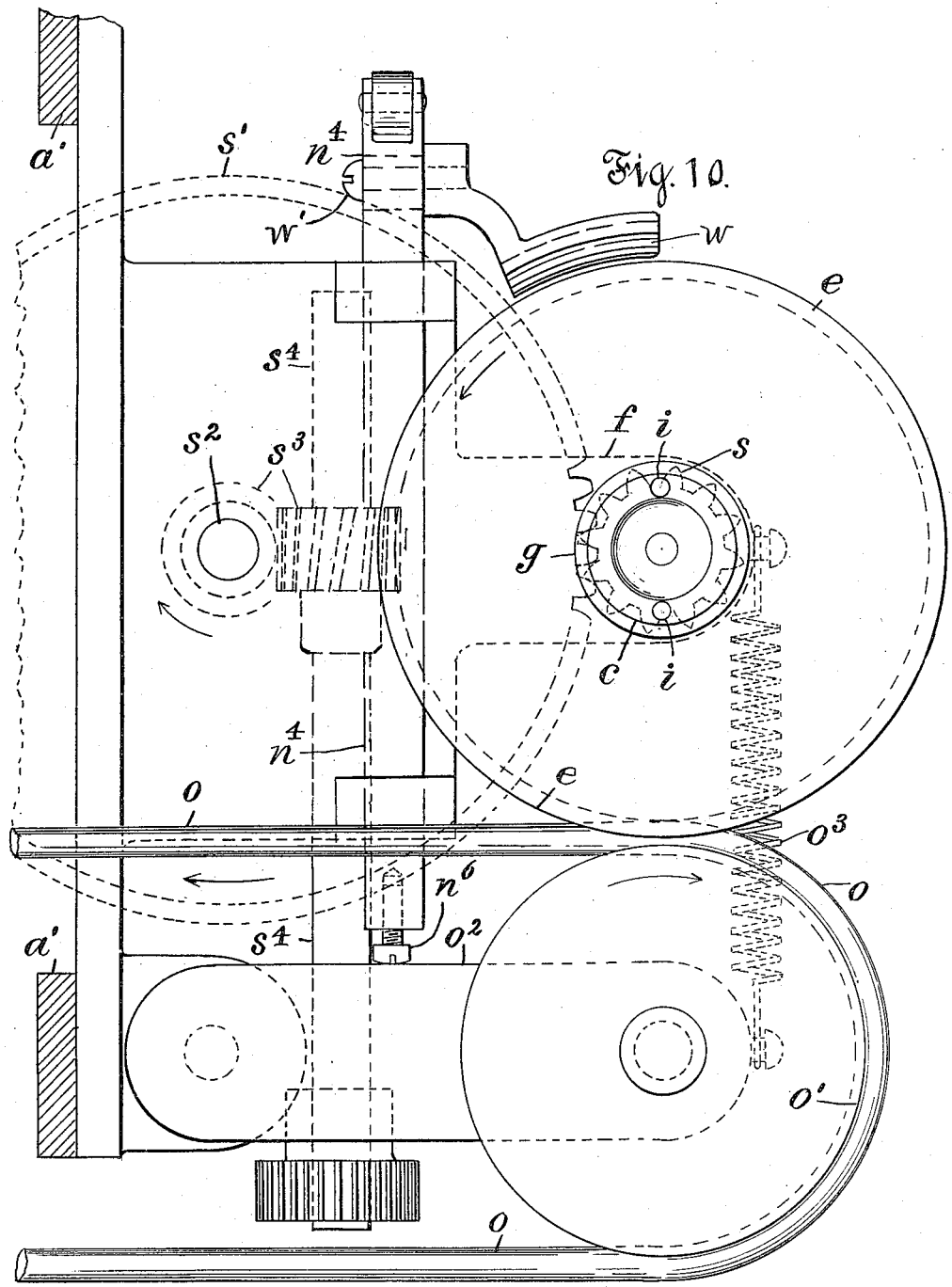

UNITED STATES PATENT OFFICE.

CHARLES WIEBKE, OF NEWARK, NEW JERSEY.

BRANCHING-MACHINE.

1,150,984.  Specification of Letters Patent.  Patented Aug. 24, 1915.

Application filed May 23, 1914. Serial No. 840,429.

*To all whom it may concern:*

Be it known that I, CHARLES WIEBKE, a citizen of the United States, residing at 48 Ridgewood avenue, Newark, county of Essex, and State of New Jersey, have invented certain new and useful Improvements in Branching-Machines, fully described and represented in the following specification and the accompanying drawings, forming a part of the same.

The present invention relates to certain improvements in so-called branching machines, in which the stems of leaves, flowers, &c., are secured to a core by a continuous wrapping applied to the core by means of a revolving spinner, and adapted, when the stem is applied, to bind the same firmly upon the core. The feeding motion of the core when one branch is applied propels the core continuously until arrested for the application of another branch, as the branch cannot be securely engaged by the wrapping while the core is in motion, and heretofore the feeding motion of the core and the rotary motion of the spinner have been controlled only by a treadle, to secure the desired spacing between the several branches.

In the present invention, automatic means is provided for intermittently arresting the motion of the parts at pre-determined intervals for the application of the branches, and such intervals are regulated by speed-cones or analogous devices, by which the intervals can be varied so as to make the space between the branches of any desired length. The rotary spinner is also connected with the feed-rolls by gearing having change-gears, so that the longitudinal movement of the core in relation to its wrapper can be varied at pleasure. The spinner comprises a spinner-disk by which the spinner is rotated, and a flier upon the hub of the disk to carry the wrapping around the core of the strand.

The machine is provided with speed-shaft which is connected to the driver for the spinner which requires a relatively high speed; and to the driving-shaft for the cam which arrests the motion of the feed and spinner at intervals.

The invention will be understood by reference to the annexed drawing, in which—

Figure 5:
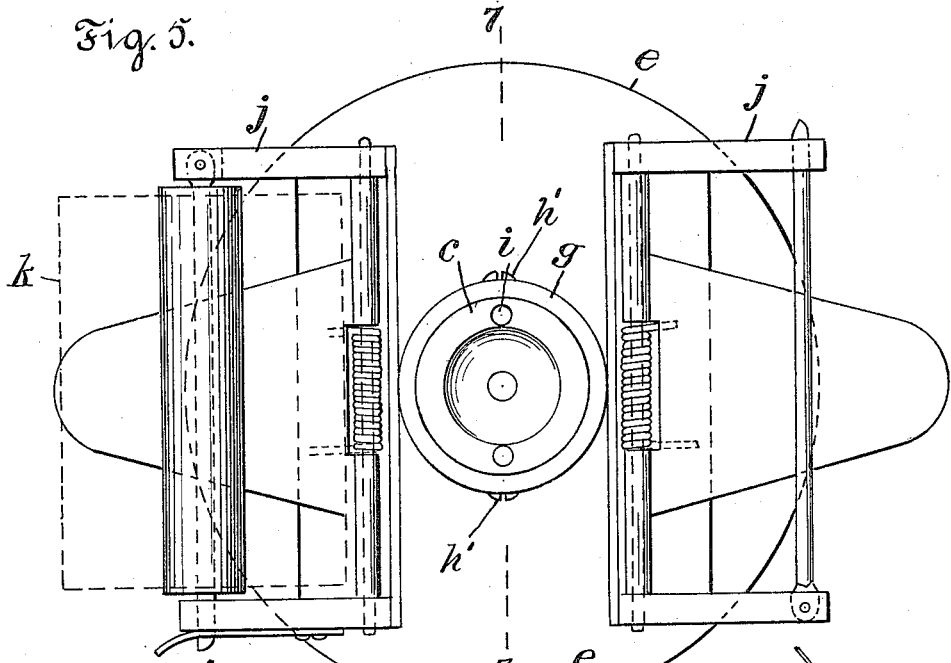
Figure 6:
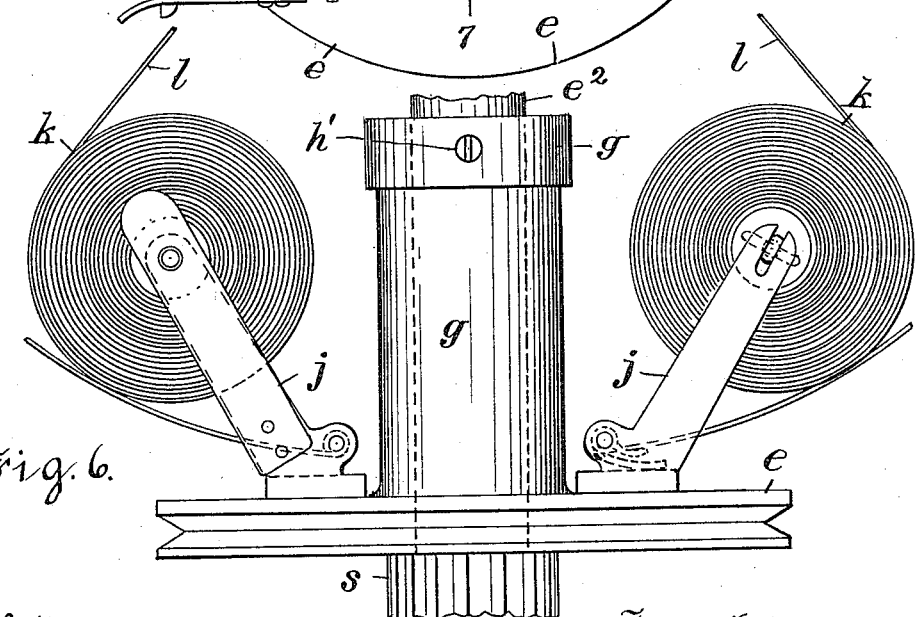

Figure 1 is a side elevation of the machine with one post of the frame broken away; Fig. 2 is a front elevation of the machine; Fig. 3 is a section on line 3—3 in Fig. 2 looking downward; Fig. 4 shows the top of the table adjacent to the spinner; Fig. 5 is a plan of the spinner-disk and flier with one of the bobbins shown in dotted lines; Fig. 6 is a side elevation of the disk and the bobbin holders; Fig. 7 is a vertical section on line 7—7 in Fig. 5; Fig. 8 shows the top of the flier viewed from the right hand side of Fig. 7; Fig. 9 is a plan of the guide-ring of the flier, with the shank of the spinner in section on line 9—9 in Fig. 8; and Fig. 10 is a plan of the spinner-disk for the spinner and the connections to its driver and to the feed-roll gears.

$a$ designates the posts of a frame, carrying a work-table $b$, in an aperture through which the top ring $c$ of the spinner revolves, and through the center of which the core $d$ is propelled by feed-rolls $d'$. Upright frame-bars $a'$ are provided under the front edge of the table to carry a bearing $f$ for the spinner-disk $e$ upon the center of which the spinner is mounted, and bearings $f'$ for the feed-rolls $d'$. A stationary spinner-tube $e'$ is projected upward from the bearing $f$, and the spinner-disk $e$ is provided with a hollow hub $g$ fitted to revolve upon the tube. The flier is formed of shank-rods $i$ fitted to holes in the top of the hub $g$ and having the ring $c$ attached to their upper ends. An annular guide-ring $c'$ is fitted movably to the shank-rods below the ring $c$, being adjusted and supported at the desired distance from the same by a set-screwed block $c^2$. Bobbin-frames $j$ upon the spinner-disk $e$ at opposite sides of the hub $g$ carry bobbins $k$ which may be wound with the material for wrapping the core $d$. Thread $l$ is shown in Fig. 7 running from the bobbin to a notch $m$ in the side of the guide $c'$, and thence wrapped around the core $d$ and the stem $n$, which is extended from a leaf $n'$ into the holes in the center of the ring $c$ and guide $c'$. Each shank-rod $i$ is secured upon the hub $g$ by a set-screw $h'$, so that the entire flier can be removed and one of different dimensions substituted when desired.

The means for driving the spinner-disk and flier is as follows: The edge of the spinner-disk $e$ is grooved, and a cord-belt $o$ is extended over a grooved pulley $o'$ which is journaled upon a hinged arm $o^2$ at one side of the spinner-disk. A spring $o^3$ presses the arm and pulley $o'$ constantly toward the spinner-disk. A motor $a^2$ is mounted upon the frame and connected with a speed-shaft $a^3$, and the endless cord $o$ is conducted over guide-pulleys $o^4$ to a pulley $o^5$ upon such shaft. The driver is thus continuously operated to rotate the spinner when permitted to press the cord $o$ upon the edge of the spinner-disk, and is retracted from the disk at intervals, when the branch is to be applied, by means of a cam-bar $n^4$ and a cam $n^5$ upon a cam-shaft $n^2$. Such cam-shaft, as shown in Fig. 1, is provided with a speed-cone $p$ having many grooves thereon, and a cone-shaft $n^3$ is provided with a speed-cone $p'$ having corresponding grooves reversely arranged, so that an endless cord $q$ can be applied to any of the grooves to vary the speed of the cam at pleasure. The cone-shaft $n^3$ is connected with the speed-shaft $a^3$ by three distinct pairs of sprocket-gears and pulleys $r$, $r'$, $r^2$, the combined effect of which is to reduce the speed of the shaft $n^3$ in the desired degree. The feed-rolls are arranged below the spinner-disk $e$ with their junction at the center line of the disk, and drawing the core $d$ from a bobbin $k'$ still lower upon the frame, the core being guided into the center of the rolls by a perforated bar $d^2$. The motion is transmitted by gearing from the spinner-disk to the rolls, so that when the spinner's motion is arrested, by the retraction of the pulley $o'$, the feed stops simultaneously. The gearing consists of a pinion $s$ made with a bushing $s^5$ fitted within the hub $g$, and extending to a head $e^2$ to hold the spinner upon the tube $e'$, and a reducing wheel $s'$ which is connected by a shaft $s^2$ and worm-gearing $s^3$ with a gear-shaft $s^4$. The gear-shaft $s^4$ is connected by cog-wheels with the rolls $d'$, and thus rotates them when the spinner is in motion.

In operating the machine, the motor is started and rotates the speed-shaft and the driver-pulley $o'$ continuously, as well as the cam-shaft $n^2$ through the medium of the gearing $r$, $r'$, $r^2$, and cones $p$, $p'$. When the cam is in the position shown in Fig. 2, it presses or retracts the pulley $o'$ and the driving cord $o$ from contact with the carrier-disk $e$, which causes the stoppage of the spinner and feed. When the cam is in the reverse position, the spring $o^3$ draws the driver against the spinner-disk as shown in Fig. 10, thus rotating the spinner and the feed-rolls. The regular rotation of the cam causes a stoppage of the spinner at intervals, which may be varied by shifting the belt $q$ upon the cone-pulleys $p$, $p'$, so as to lengthen or shorten the periods or spaces between the application of the branches.

It is desirable to omit a branch at certain intervals to permit the cutting of the core with the branches attached, and such interval is indicated in the present invention by an index $t$ rotated with a shaft $u$ by a worm and worm-wheel connection $u'$ with the cam-shaft. A pointer $t'$ is fixed upon the table-top to indicate when the index has completed a rotation. If the worm-wheel $u'$ had ten teeth it would rotate the index once for ten rotations of the cam-shaft, and indicate to the operator that the tenth branch should be omitted from the core. The worm-wheel $u'$ is made detachable and changeable, so that another can be substituted having eight, twelve, twenty, or any desired number of teeth; the bearing $v'$ for the index-shaft being adjustable in a slot $v$ in the table $b$, to adjust the worm-wheel to the worm upon the cam-shaft.

It will be understood by reference to Fig. 7, that the flier is secured detachably upon the hub of the spinner-disk by set-screws $h'$, so that the flier can be removed for repairs, or another of different dimensions substituted when desired.

When the driver $o'$ is retracted from the spinner-disk the impelling force is withdrawn from the disk, but owing to the high velocity at which it is usually driven it is desirable to apply a brake simultaneously with the retraction of the driver, and this is effected by attaching to the cam-bar or slide $n^4$ a brake $w$ shown in Figs. 2 and 10, which brake consists of a rubber shoe adapted to fit the groove in the periphery of the spinner-disk $e$ and pressed into such disk by the movement of the slide when it retracts the driver $o'$. An adjustable screw $n^6$ is shown in Fig. 10 upon the end of the cam-slide, next the lever $o^2$ which carries the driver $o'$, such screw permitting an adjustment of the slide in relation to the lever to permit the friction-cord $o$ to press fully upon the spinner-disk when the cam is retracted. To secure the proper pressure of the brake upon the spinner-disk when the cam is advanced, the foot of the brake is made adjustable upon the cam-slide and secured in the adjusted position by a slot and screw connection $w'$. These adjustments enable the operator to secure the variability that is required, in connection with a cam which gives an unchanging movement.

From the above description it will be seen that the mechanism is adapted to propel the core continuously, but that the movement is arrested at regular pre-determined intervals by the automatic action of the cam, and as the machine is thus automatically actuated no manual labor is required of the operator, except to apply the branches to the core when it is arrested. The movability of the indicator causes it to attract the notice of the operator when it reaches the pre-determined point marked $t'$, and the operator is thus guided in omitting one of the branches at a suitable point for cutting the core. The machine is thus enabled to operate with great rapidity, and its parts are adjustable to secure the desired spacing between the branches upon the core and the proper operation of all the driving parts.

Having thus set forth the nature of the invention what is claimed herein is:

1. In a machine for branching strands of artificial flowers, the combination, with means adapted to propel or feed a core continuously, of means for winding a wrapping upon the core and upon the stem of the branch when applied thereto, means operating intermittently to temporarily arrest the movement of the core at pre-determined intervals, and means operating after each arrest of the core to automatically renew the feeding movement, whereby the only manual action required of the operator is the application of the branches to the core when arrested.

2. The combination, in a branching machine, means operating automatically to arrest the spinner and stop the feed movement of the core at regular pre-determined intervals, and an indicator moved continuously through a plurality of the core's movements and showing to the operator by its position, at which stoppage of the core a branch should be omitted to provide for the cutting of the core.

3. The combination in a branching machine, of a cam and connections for arresting the spinner and the feed movement of the core at intervals, a worm upon the shaft of the cam, an indicator and shaft to rotate the same, and a worm-wheel fitted removably and changeably upon such shaft to engage the worm, as and for the purpose set forth.

4. In a branching machine, the combination, with a spinner for winding a wrapping upon a core and its branches, of rolls for feeding the core, gearing connecting such rolls with the spinner, a driver to rotate the spinner and automatic mechanism operated intermittently to connect the driver with the spinner to propel the core between the application of the branches.

5. In a branching machine, the combination, with a spinner-disk having a flier for winding a wrapping upon a core and its branches, of rolls for feeding the core, gearing connecting such rolls with the spinner-disk, a friction-drive for rotating the disk, and a continuously rotating cam operating at each rotation to connect and disconnect such friction-driver with the disk.

6. In a branching machine, the combination, with a spinner-disk having a flier for winding a wrapping upon a core and its branches, of rolls for feeding the core, gearing connecting such rolls with the disk, a friction-driver for rotating the disk, means for pressing the driver against the disk, a continuously rotating cam operating at each disk, and a brake simultaneously operated rotation to press the driver away from the by the cam to arrest the motion of the disk.

7. In a branching machine, the combination, with a spinner-disk and a flier, of rolls for feeding a core through such disk and flier, gearing with change-gears connecting the disk with the feed-rolls, a friction-driver with spring to press it toward the disk to rotate the same, a cam-slide with a continuously rotating cam for intermittently retracting the driver from the disk, and means for simultaneously arresting the spinner and the feed.

8. In a branching machine, the combination, with a spinner-disk and flier for winding a wrapping upon a core and the stem of a branch, of means for feeding the core, a cam and means operating to arrest the core and flier at the required intervals, and means for varying the rotary speed of the cam to vary the spaces between the said branches.

9. In a branching machine, the combination, with a spinner for winding a wrapping upon a core and the stem of a branch, of a driver to rotate the spinner, a speed-shaft with connections to such driver, a cam-shaft and cam with connections to retract the driver from the spinner, a cone-shaft and reducing gear connecting the same with the speed-shaft, a speed-cone upon the cam-shaft corresponding with the cone upon the cone-shaft, and a belt connecting the speeds of the said cones to vary the rotary speed of the cam, as desired.

10. In a branching machine, the combination, with a spinner-disk and bobbin carried thereby, of a shank projected upward from the disk with a concentric ring upon the top, and a perforated guide for the wrapper adjustable vertically upon the said shank.

11. In a branching machine, the combination, with a spinner-disk with bobbins carried thereby and a perforated hub on the center, of a flier clamped detachably in such hub with shank-rods projected upwardly therefrom, and having a concentric ring upon the top of such rods, and a perforated guide for the wrapper adjustable vertically upon such rods, the flier being removable from the hub for change or repairs.

12. In a branching machine, the combination, with a work-table, of a flier having a perforated ring revolving flush with the table and a perforated guide for the wrapper adjustable to and from such ring to vary the application of the wrapper to the stems of the branches.

13. In a branching machine, the combination, with a work-table, of a spinner and feed-rolls for feeding a core through such spinner, a driver for the spinner, a cam and connections for retracting the driver from the spinner at intervals, a motor with connections to the driver and to the shaft of the cam for rotating them at the desired speed, and an indicator movable over the surface of the table to indicate the application of the branches to the core.

In testimony whereof I have hereunto set my hand in the presence of two subscribing witnesses.

CHARLES WIEBKE.

Witnesses:
 L. LEE,
 THOMAS S. CRANE.

Copies of this patent may be obtained for five cents each, by addressing the "Commissioner of Patents, Washington, D. C."